(12) United States Patent  
Kim et al.

(10) Patent No.: US 10,313,426 B2  
(45) Date of Patent: Jun. 4, 2019

(54) METHOD OF MANAGING CONTROL RIGHT, CLIENT DEVICE THEREFOR, AND MASTER DEVICE THEREFOR

(71) Applicant: Samsung Electronics Co., Ltd., Suwon-si, Gyeonggi-do (KR)

(72) Inventors: Jeong-in Kim, Suwon-si (KR); Ji-hwan Seo, Suwon-si (KR); Jin-wook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 14/486,227

(22) Filed: Sep. 15, 2014

(65) Prior Publication Data

US 2015/0082184 A1 Mar. 19, 2015

(30) Foreign Application Priority Data

Sep. 17, 2013 (KR) .......... 10-2013-0112077

(51) Int. Cl.
| | | |
|---|---|---|
| *G06F 3/0481* | (2013.01) | |
| *H04L 29/08* | (2006.01) | |
| *H04W 4/50* | (2018.01) | |
| *H04W 4/80* | (2018.01) | |

(52) U.S. Cl.
CPC .......... *H04L 67/10* (2013.01); *H04L 67/025* (2013.01); *H04W 4/50* (2018.02); *H04W 4/80* (2018.02)

(58) Field of Classification Search
CPC ....................................... H04L 67/10
USPC ......................................... 715/740
See application file for complete search history.

(56) References Cited

U.S. PATENT DOCUMENTS

| 5,581,702 | A | * | 12/1996 | McArdle | G06Q 10/10 370/261 |
|---|---|---|---|---|---|
| 7,843,866 | B1 | * | 11/2010 | Madnani | H04L 12/185 370/312 |
| 9,195,367 | B2 | * | 11/2015 | Chakra | G06F 3/0481 |
| 9,218,102 | B1 | * | 12/2015 | Greenspan | G06F 3/0481 |
| 9,270,713 | B2 | * | 2/2016 | Huang | H04L 65/403 |
| 9,411,489 | B2 | * | 8/2016 | Leacock | H04L 12/1827 |
| 2002/0169832 | A1 | * | 11/2002 | Lee | G06Q 10/10 709/205 |
| 2004/0179036 | A1 | * | 9/2004 | Teplov | G06F 3/1454 715/751 |
| 2004/0181577 | A1 | * | 9/2004 | Skurikhin | G06Q 10/10 709/204 |
| 2004/0181579 | A1 | * | 9/2004 | Huck | G06Q 10/10 709/205 |
| 2004/0181796 | A1 | * | 9/2004 | Fedotov | G06F 3/1454 719/323 |

(Continued)

FOREIGN PATENT DOCUMENTS

WO 03/017022 A2 2/2003

*Primary Examiner* — Reza Nabi  
(74) *Attorney, Agent, or Firm* — Jefferson IP Law, LLP

(57) ABSTRACT

A method of managing a control right in a 1:n network topology is provided. The master device includes a display unit configured to display a first screen, a control unit configured to receive a request for at least one right for controlling the master device and/or a mirroring service from at least one of a plurality of client devices mirroring the first screen, and to grant the requested right to the at least one of the plurality of client devices in response to the request, and a communication unit configured to receive the request and to transmit the response.

18 Claims, 10 Drawing Sheets

(56) References Cited

U.S. PATENT DOCUMENTS

| | | | |
|---|---|---|---|
| 2007/0150551 A1* | 6/2007 | Krishnan | G06Q 10/10 709/218 |
| 2008/0010501 A1* | 1/2008 | Bucher | H04L 67/1095 714/6.11 |
| 2008/0027992 A1* | 1/2008 | Vadavia | H04L 29/06027 |
| 2011/0270933 A1* | 11/2011 | Jones | H04L 12/1822 709/206 |
| 2012/0110515 A1* | 5/2012 | Abramoff | G06F 17/30994 715/854 |
| 2012/0157044 A1* | 6/2012 | Kim | G06F 21/84 455/410 |
| 2013/0125018 A1* | 5/2013 | Park | G06Q 10/00 715/748 |
| 2013/0148720 A1* | 6/2013 | Rabii | G06F 3/1454 375/240.12 |
| 2013/0298061 A1* | 11/2013 | Bimson | G06Q 10/06 715/771 |
| 2014/0025744 A1* | 1/2014 | Kim | G06F 3/1454 709/204 |
| 2014/0040763 A1* | 2/2014 | Chakra | G06F 3/0482 715/748 |
| 2014/0258441 A1* | 9/2014 | L'Heureux | H04W 12/06 709/217 |
| 2015/0149929 A1* | 5/2015 | Shepherd | H04L 65/403 715/753 |
| 2015/0160913 A1* | 6/2015 | Lee | G06F 3/1454 345/2.2 |
| 2016/0241609 A1* | 8/2016 | Xin | H04L 65/403 |
| 2017/0243251 A1* | 8/2017 | Weiser | G06Q 30/02 |

* cited by examiner

METHOD OF MANAGING CONTROL RIGHT, CLIENT DEVICE THEREFOR, AND MASTER DEVICE THEREFOR

CROSS-REFERENCE TO RELATED APPLICATION(S)

This application claims the benefit under 35 U.S.C. § 119(a) of a Korean patent application filed on Sep. 17, 2013 in the Korean Intellectual Property Office and assigned Serial number 10-2013-0112077, the entire disclosure of which is hereby incorporated by reference.

TECHNICAL FIELD

The present disclosure relates to a method of managing a control right, a client device therefor, and a master device therefore. More particularly, the present disclosure relates to a control right management method for requesting for and acquiring a certain right through a mirroring service connection, a client device therefor, and a master device therefor.

BACKGROUND

Along with the development of wired and wireless communication networks, electronic devices for outputting a screen and displaying data visually recognizable by a user on the screen may be mutually connected via the wired and wireless communication networks.

The electronic devices may transmit or receive various kinds of data via the wired and wireless communication networks, and one electronic device may control another electronic device remotely or use a third electronic device via another electronic device. A mirroring technique is necessary for the remote control or the sharing between electronic devices described above.

The mirroring technique is a technique capable of sharing and operating screen data between devices having a display unit. The mirroring technique allows Personal Computers (PCs) to share and use screen data.

In addition, the mirroring technique has been developed so as to be applied to all electronic devices capable of outputting a screen through a display unit, such as portable computers including laptop computers, netbooks, tablet PCs, and the like, portable terminals including smartphones and Portable Digital Assistants (PDAs), TVs, and the like. A mirroring service for allowing a plurality of electronic devices to share a screen and mutually perform a remote control by applying the mirroring technique thereto may be provided. Techniques for providing the mirroring service are, for example, Display as a Service (DaaS), Miracast, Airplay, and the like.

Hereinafter, all electronic devices capable of using the mirroring service by sharing and displaying a screen are referred to as "display devices".

In the mirroring service, a certain image is transmitted from a device, which provides an image to a device which receives an image. The device, which provides an image, may be referred to as a source device or a master device, and the device, which receives an image, may be referred to as a sink device or a client device. Hereinafter, the device, which provides an image, is referred to as a master device, and the device, which receives an image, is referred to as a client device.

According to the currently developed mirroring service technology, in a one-to-one network topology in which one master device and one client device are connected to each other, when the mirroring service starts after a network connection between the two devices is completed, the entire control right is given to the client device. Since the number of client devices having a control right is one in the one-to-one network topology, a collision of the control right does not occur.

However, since many electronic devices capable of connecting to a network, such as smartphones, smart TVs, tablet PCs, and the like, have recently been released to the market, individual users usually have a plurality of electronic devices, and thus, a 1:n network topology in which a plurality of client devices are connected to one master device occurs frequently. However, since it is assumed that the currently developed mirroring service technology is only for the one-to-one network topology, there is no method of allocating a control right between client devices in the 1:n network topology.

As a result, when the currently developed mirroring service technology is used, since all of the n client devices have a control right in the 1:n network topology, control rights for controlling the master device may overlap each other, thereby resulting in disorder in controlling the master device.

For example, when a client device 1 and a client device 2 are connected to one master device, if the client device 1 and the client device 2 try to move a screen of the master device at the same time, a control right collision problem occurs. Accordingly, each of the client device 1 and the client device 2 may not serve a desired screen.

Therefore, a method and apparatus for allocating or managing a control right between a plurality of client devices in the 1:n network topology is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of managing a control right, by which each of a plurality of client devices is conveniently allocated the control right in a 1:n network topology in which one master device and the plurality of client devices are connected, a client device therefor, and a master device therefor.

One or more embodiments of the present disclosure include a control right managing method for individually allocating a particular control right so as to solve a problem such that a desired operation cannot be performed due to overlap of control rights between a plurality of client devices in a 1:n network topology, a client device therefor, and a master device therefor.

Additional aspects will be set forth in part in the description which follows and, in part, will be apparent from the description, or may be learned by practice of the presented embodiments.

In accordance with an aspect of the present disclosure, a master device is provided. The master device includes a display unit configured to display a first screen, a control unit configured to receive a request for at least one right for controlling the master device and/or a mirroring service from at least one of a plurality of client devices mirroring the first screen, and to grant the requested right to the at least one of the plurality of client devices in response to the request, and a communication unit configured to receive the request and to transmit the response.

In accordance with another aspect of the present disclosure, a client device is provided. The client device includes a display unit configured to display a second screen that is a mirroring screen of a first screen displayed on a master device, a control unit configured to request the master device for at least one right for controlling the master device and/or a mirroring service and to receiving the requested at least one right from the master device in response to the request, and a communication unit configured to transmit the request to the master device and to receive the response from the master device.

In accordance with another aspect of the present disclosure, a method of managing a control right is provided. The method includes performing a mirroring service between one master device and a plurality of client devices, requesting, by at least one of the plurality of client devices, the master device for at least one right for controlling the master device and/or the mirroring service, and granting, by the master device, the requested right to the at least one of the plurality of client devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As described above, a plurality of display devices may be connected to one other so as to mutually control the plurality of display devices in remote and mutually use them.

A plurality of display devices using a mirroring service include at least one master device and at least one client device, wherein the at least one master device and the at least one client device are connected to each other through a wired or wireless network.

A connection relationship between display devices according to an embodiment of the present disclosure is described below with reference to FIG. 1.

Figure 1:
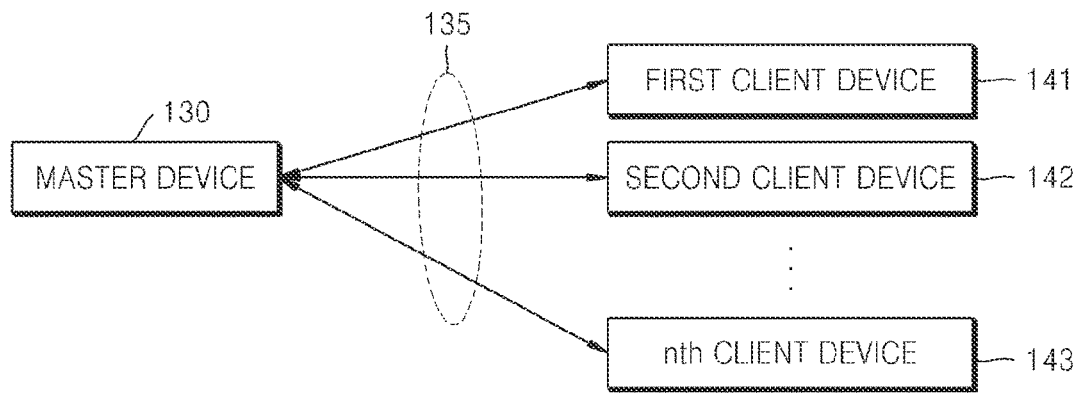
FIG. 1 illustrates a mirroring connection between a master device and client devices according to an embodiment of the present disclosure.

FIG. 1 illustrates a mirroring connection between a master device and client devices according to an embodiment of the present disclosure.

Referring to FIG. 1, the display devices are electronic devices including a display unit and may be a master device or a client device. In addition, the electronic devices may be a portable computer, such as a laptop computer, a netbook, a tablet Personal Computer (PC), or the like; a portable terminal, such as a smartphone or a Personal Digital Assistant (PDA); a PC; a smart TV; or the like.

FIG. 1 illustrates a mirroring connection between a master device 130 and first to nth client devices 141, 142, and 143 according to an embodiment of the present disclosure.

Referring to FIG. 1, one master device 130 and the first to nth client devices 141, 142, and 143 are connected in a 1:n network topology. The master device 130 is connected to the first to nth client devices 141, 142, and 143 through a certain network 135 in a 1:n network topology.

One master device 130 may copy and transmit the entire screen, a certain region of the screen, or different regions of the screen to the first to nth client devices 141, 142, and 143.

The certain network 135 is a wired or wireless communication network through which certain data may be transmitted and received. The certain network 135 may be formed according to a variety of communication network standards, such as Local Area Network (LAN), Wide Area Network (WAN), Wireless LAN (WLAN) or Wi-Fi, third-generation (3G), Long Term Evolution (LTE), Wireless Broadband (WiBro), Code Division Multiple Access (CDMA), Wideband CDMA (WCDMA), and Near Field Communication (NFC) standards.

The master device 130 may display a menu screen for controlling an operation of the master device 130, a video play screen, a menu screen, or the like. The master device 130 generates image data corresponding to a currently displayed screen and transmits the generated image data to the first to nth client devices 141, 142, and 143. The master device 130 may generate and transmit image data corresponding to the entire screen being currently displayed or may divide the currently displayed screen and generate and transmit image data corresponding to at least one divided region of the screen.

Each of the first to nth client devices 141, 142, and 143 receives image data corresponding to a screen being displayed on the master device 130 through the certain network 135. Each of the first to nth client devices 141, 142, and 143 may display a screen generated by decoding the image data received from the master device 130.

Each of the first to nth client devices 141, 142, and 143 receives image data corresponding to a screen being displayed on the master device 130, once or multiple times. Each of the first to nth client devices 141, 142, and 143 may display a screen that is the same as and corresponds to the screen being displayed on the master device 130 by using the received image data.

Figure 2:
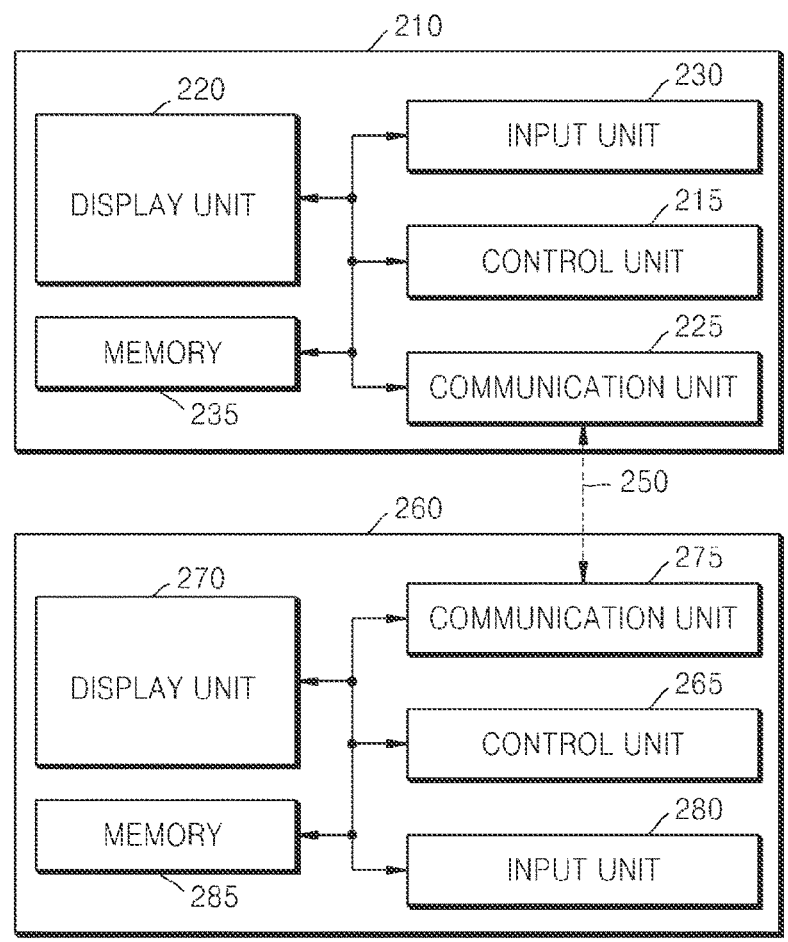
FIG. 2 is a block diagram of a master device and a client device according to an embodiment of the present disclosure.

FIG. 2 is a block diagram of a master device 210 and a client device 260 according to an embodiment of the present disclosure.

Referring to FIG. 2, as described with reference to FIG. 1, a master device and client devices according to an embodiment of the present disclosure are connected in a 1:n network topology, but FIG. 2 illustrates only one client device 260 for convenience of description.

The master device 210 according to an embodiment of the present disclosure may include a control unit 215, a display unit 220, and a communication unit 225. In addition, the master device 210 may further include an input unit 230 and a memory 235.

The client device 260 according to an embodiment of the present disclosure may include a control unit 265, a display unit 270, and a communication unit 275. In addition, the client device 260 may further include an input unit 280 and a memory 285.

The control unit 215 generates image data. The control unit 215 may generate a screen to be displayed on the display unit 220 by decoding image data, such as still image data or video data. The control unit 215 may also generate a menu screen, a user interface screen, or the like.

The display unit 220 displays the image data generated by the control unit 215. The display unit 220 receives a certain screen corresponding to the image data generated by the control unit 215 and outputs the received certain screen to a display panel (not shown). A screen displayed by the display unit 220 and mirrored by the client device 260 is referred to as a first screen. In a mirroring service, the display unit 220 displays the first screen.

The communication unit 225 transmits or receives data to or from other display devices connected thereto through a certain network 250. The communication unit 225 may transmit the image data generated by the control unit 215 to at least one other display device, e.g., the communication unit 275 of the client device 260.

The communication unit 225 may include a communication module for connecting to the certain network 250 in a wired or wireless manner. For example, the communication module may include WLAN (Wi-Fi), 3G, LTE, WiBro, World interoperability for microwave access (WiMAX), CDMA, and WCDMA modules.

The communication unit 225 of the master device 210 may also include a communication module according to NFC technology. Accordingly, the communication unit 225 supports a proximity connection scheme, and thus, when the master device 210 is close to or contacts the client device 260, the communication unit 225 may transmit or receive certain data.

The input unit 230 allows a user to input a request or a command for controlling an operation of the master device 210 or to input other data. The input unit 230 may be formed with a touch screen. The input unit 230 may include a touch pad (not shown) coupled to a display panel (not shown), thereby outputting a touch screen to the display panel. The display unit 220 displays the touch screen on the display panel. The input unit 230 detects a certain command by the touch pad when the certain command is inputted through the touch screen.

For example, when the input unit 230 is formed with a touch screen, the input unit 230 may output a menu screen that is a user interface screen on the display panel coupled to the touch pad. When the user touches a certain point of the menu screen, e.g., a point where a mirroring service menu is displayed, the input unit 230 detects the touch point. The input unit 230 may transmit the detected information to the control unit 215.

The control unit 215 may recognize a request or command of the user, which corresponds to a menu displayed on the detected point, and perform the recognized request or command. For example, when the point where the mirroring service menu is displayed is touched, the input unit 230 may transmit information for requesting to execute a mirroring service to the control unit 215. Alternatively, when the input unit 230 transmits position information of the touch point to the control unit 215, the control unit 215 may perceive that a menu corresponding to the position information is the mirroring service menu and may control the master device 210 so as to execute a mirroring service.

The memory 235 may store programs to be used to operate the master device 210, data to be transmitted, received data, and the like.

When a mirroring service is requested through the input unit 230, the control unit 215 executes the requested mirroring service. The control unit 215 generates a transport stream by encoding and multiplexing image data of a currently displayed screen. The communication unit 225 transmits the transport stream generated by the control unit 215 to the client device 260.

In the master device 210 according to an embodiment of the present disclosure, the control unit 215 receives a request for at least one right for controlling the master device 210 and/or the mirroring service from at least one of a plurality of client devices mirroring the first screen being displayed by the display unit 220. In response to the request, the control unit 215 grants the requested right to the at least one of the plurality of client devices.

A right that the client device 260 is able to request and a right grantable by the master device 210 includes at least one of a screen control right, an application execution right, and a mirroring control right.

The screen control right is a right for controlling a screen displayed on the master device 210. The screen control right is described below with reference to FIGS. 6 and 7.

The application execution right is a right for executing and controlling an application executable by the master device 210. The application executable by the master device 210 includes an application installed in the master device 210 and an application to be downloaded to the master device 210. The application execution right is described below with reference to FIG. 8.

The mirroring control right is a right for controlling an operation of the mirroring service and may include a right for connecting, pausing, and releasing the mirroring service.

The communication unit 225 may receive a request transmitted from the at least one of the plurality of client devices, provide the received request to the control unit 215, and transmit a response generated by the control unit 215 to the client device which has transmitted the request.

The input unit 230 may output a menu screen including a right requested by a certain client device and allow the user to select at least one right to be granted to the certain client device, through the menu screen.

The client device 260 is at least one other display device connected to the master device 210 through the certain network 250 and is a display device which mirrors and outputs at least one screen being displayed on the master device 210. Hereinafter, the screen mirrored and displayed by the client device 260 is referred to as a second screen.

In the client device 260, the control unit 265, the display unit 270, the communication unit 275, the input unit 280, and the memory 285 are similar to the control unit 215, the display unit 220, the communication unit 225, the input unit 230, and the memory 235 described above, respectively, and thus, their repeated description is omitted.

The communication unit 275 receives image data from the communication unit 225 of the master device 210. The communication unit 275 is connected to the communication unit 225 of the master device 210 through the certain network 250 in a wired or wireless manner and receives image data including the first screen, which is transmitted from the communication unit 225.

The control unit 265 generates a screen or a partial screen corresponding to a certain portion of the screen, which is included in the received image data. The control unit 265 generates the second screen corresponding to the received image data in order to mirror the image data being displayed on the master device 210.

The control unit 265 may mirror the entire screen corresponding to the received image data or a certain partial screen corresponding to a portion of the received image data.

The display unit 270 displays a certain screen generated by the control unit 265. Since the mirroring service is performed, the display unit 270 displays the second screen that mirrors the first screen. The second screen is the same as the first screen. The second screen may be the first screen or a magnified screen of a portion of the first screen.

In the client device 260 according to an embodiment of the present disclosure, the control unit 265 requests the master device 210 for at least one right for controlling the master device 210 and/or the mirroring service. The client device 260 may receive the requested at least one right granted in response to the request from the master device 210.

A right that the client device 260 is able to request includes at least one selected from the group including the screen control right, the application execution right, and the mirroring control right as described above.

The communication unit 275 may transmit a request for a right to the master device 210, receive a response in response to the request from the master device 210, and provide the received response to the control unit 265.

The input unit 280 may output a menu screen and allow a user to select at least one right to be requested from the master device 210, through the menu screen. The menu screen may include a selection list of the screen control right, the application execution right, and the mirroring control right as described above. Further, the display unit 270 displays a menu screen including rights. The menu screen includes the screen control right, the application execution right, and the mirroring control right as described above.

Operations of the master device 210 and the client device 260 are described below with reference to FIGS. 3 to 11.

Figure 3:
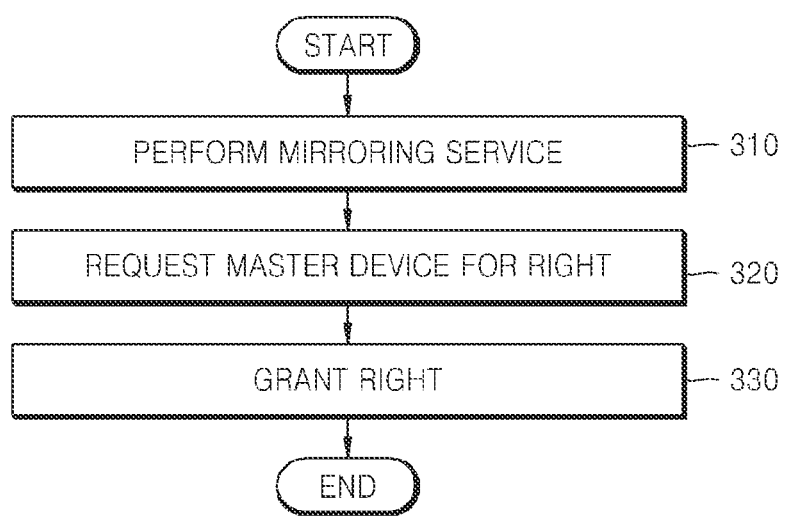
FIG. 3 is a flowchart of a method of managing a control right according to an embodiment of the present disclosure.

FIG. 3 is a flowchart of a method 300 of managing a control right, according to an embodiment of the present disclosure.

Referring to FIG. 3, the method is performed in a 1:n network topology. In addition, the method may be performed by the master device 210 and/or the client device 260 shown in FIG. 2. Accordingly, the method is described with reference to the master device 210 and the client device 260 shown in FIG. 2, and the same description as made with reference to FIG. 2 is omitted.

In operation 310, a mirroring service is performed between one master device and a plurality of client devices. The master device and the plurality of client devices may be connected at the same time. Alternatively, after the master device and one client device are connected, at least one client device may be additionally connected to the master device, thereby establishing the 1:n network topology. According to operation 310, the master device and the plurality of client devices in the 1:n network topology may display the same screen.

In operation 320, at least one of the plurality of client devices requests the master device for at least one right for controlling the master device and/or the mirroring service. Operation 320 may be performed according to control of the control unit 265 of the client device 260. The at least one right that at least one of the plurality of client devices is able to request includes at least one of the screen control right, the application execution right, and the mirroring control right as described above.

In operation 320, any one of the plurality of client devices may selectively request for at least one of a plurality of rights for controlling an operation of the master device and execution of the mirroring service. For example, the client device 260 may selectively request the master device 210 for at least one of the screen control right, the application execution right, and the mirroring control right.

In operation 320, when a certain client device is connected to the master device, the certain client device may request for at least one right. Alternatively, when a certain client device is connected to the master device, a right set to be requested by the certain client device may be requested from the master device. For example, when the master device 210 and the client device 260 are connected by the mirroring service, a menu screen for a right request may be automatically popped up on the client device 260 immediately after the connection. The user may select and input at least one right to be requested from the master device 210, through the menu screen, and the client device 260 may request the master device 210 for the inputted right.

As another example, when the master device 210 and the client device 260 are connected by the mirroring service, the client device 260 may automatically request the master device 210 for a preset certain right immediately after the connection. For example, when all of the screen control right, the application execution right, and the mirroring control right described above are requested, immediately after the master device 210 and the client device 260 are connected by the mirroring service, the client device 260 may request the master device 210 for the three rights described above.

In operation 330, the master device, which has received the request in operation 320, grants the requested right to the at least one of the plurality of client devices. Operation 330 may be performed according to control of the control unit 215 of the master device 210. When the master device 210 grants a certain right to the plurality of client devices, the master device 210 grants the certain right so that the certain right is not granted to two or more client devices. A drawing right of the screen control right may be granted to two or more client devices as described below.

In operation 330, when a right is requested, the master device 210 may grant at least one right to at least one of the plurality of client devices according to a user command which is inputted through the input unit 230.

The control unit 215 of the master device 210 may grant at least one right to at least one of the plurality of client devices according to certain priorities. The certain priorities may be set by the user or the control unit 215 of the master device 210. For example, as the example in FIG. 1, when the first to nth client devices 141, 142, and 143 are connected to one master device 130, and priorities are set in the order of the first to nth client devices 141, 142, and 143, if the first and second client devices 141 and 142 request the master device 130 for a certain right at the same time, the master device 130 may grant the certain right to the first client device 141 having the highest priority.

Figure 4:
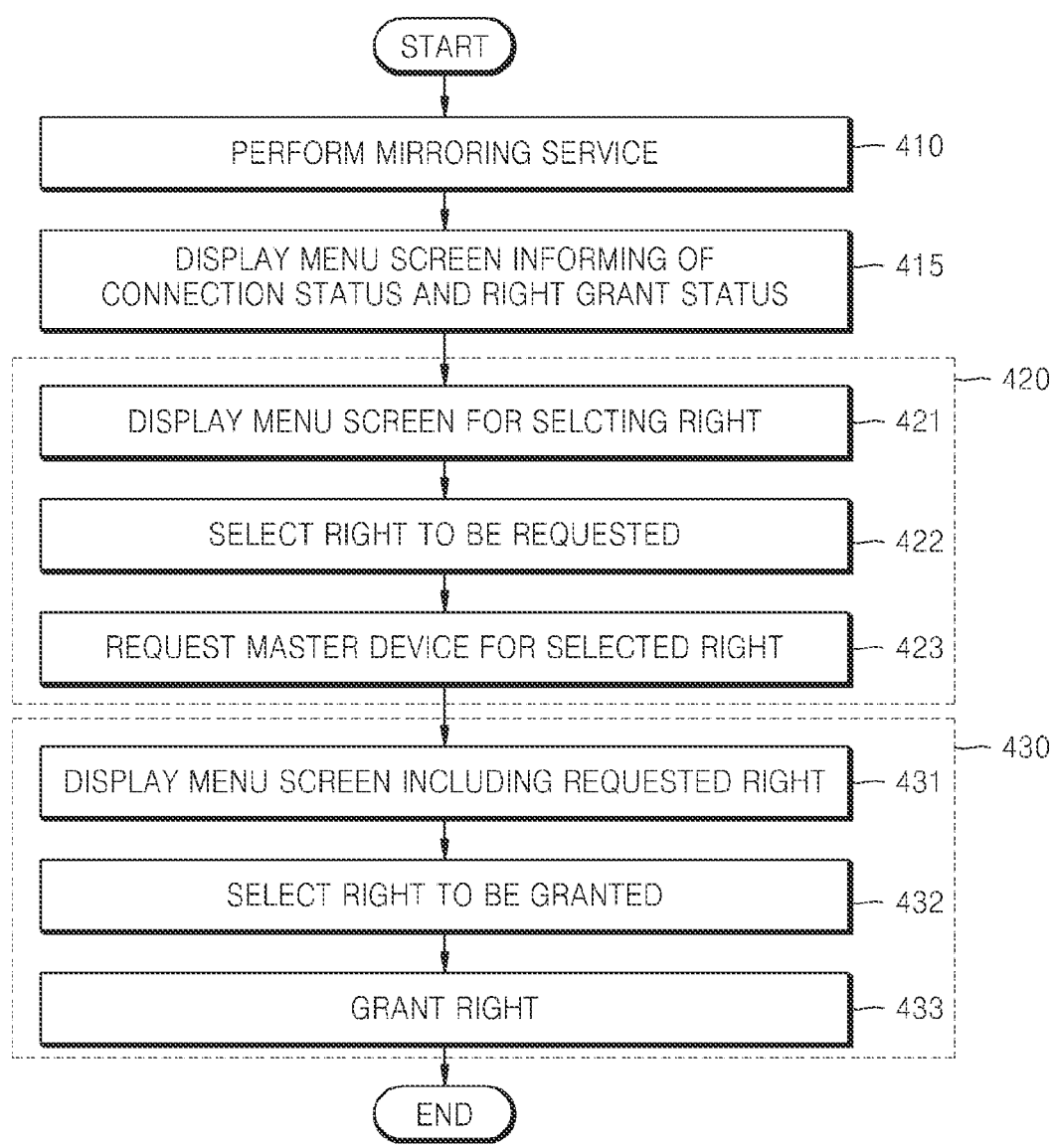
FIG. 4 is a flowchart of a method of managing a control right according to an embodiment of the present disclosure.

FIG. 4 is a flowchart of a method 400 of managing a control right according to an embodiment of the present disclosure.

Referring to FIG. 4, operations 410, 420, and 430 are the same as and correspond to operations 310, 320, and 330 of the method 300 in FIG. 3, respectively. Therefore, the same description as made with reference to FIG. 3 is omitted. In addition, the method is performed in a 1:n network topology and may be performed by the master device 210 and/or the client device 260 shown in FIG. 2.

In operation 410, a mirroring service is performed.

In operation 420, at least one of a plurality of client devices requests a master device for at least one right for controlling the master device and/or the mirroring service. Operation 420 is described below with reference to FIG. 5. Operation 420 may include operations 421, 422, and 423.

Figure 5:
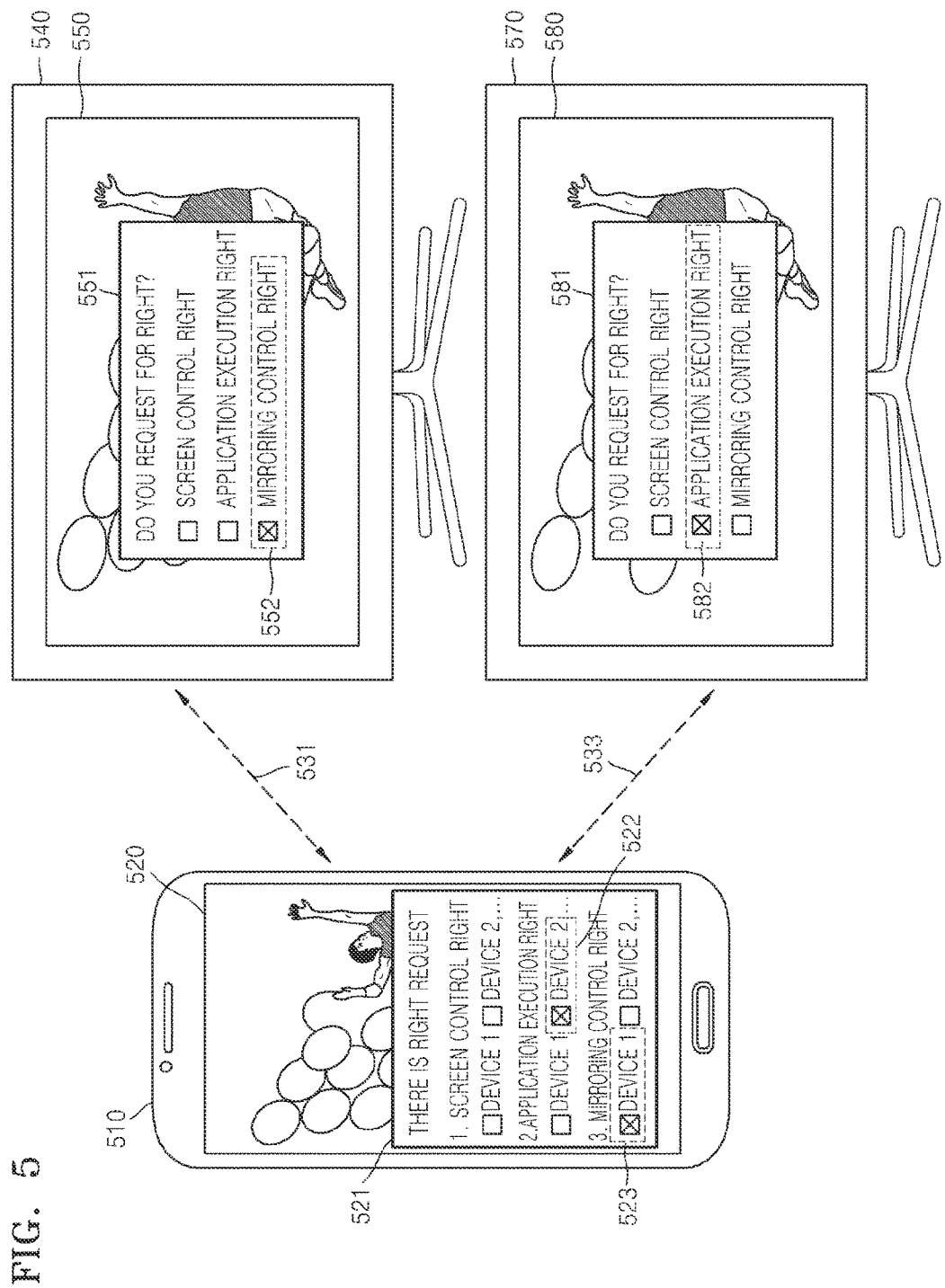
FIG. 5 illustrates a method of managing a control right according to an embodiment of the present disclosure.

FIG. 5 illustrates a method of managing a control right according to an embodiment of the present disclosure.

Referring to FIG. 5, FIG an example is shown where one master device 510 and two client devices (i.e., first and second client devices 540 and 570), are mirror-connected through certain networks 531 and 533. The master device 510 and the first or second client device 540 or 570 are the same as and correspond to the master device 210 and the client device 260 shown in FIG. 2, respectively.

Referring to FIGS. 5 to 9, a master device is illustrated as a smartphone, and client devices are illustrated as smart TVs. Accordingly, referring to FIG. 5, a screen being displayed on the smartphone 510 is mirrored and displayed on the smart TVs 540 and 570.

In operation 421, a menu screen for selecting at least one of the at least one right is displayed on a certain client device. A menu screen for selecting at least one of the screen control right, the application execution right, and the mirroring control right is displayed on the certain client device. Operation 421 may be performed by the display unit 270 according to control of the control unit 265.

The menu display in operation 421 may be performed immediately after the certain client device is connected to the master device and the mirroring service is performed. Alternatively, the menu display may be performed according to a request of a user when the user desires to request for a right through the certain client device. When the user inputs a certain command in order to request for a right, a menu may be displayed in response to the certain command.

Referring to FIG. 5, a menu screen 551 may be displayed on a screen 550 of the first client device 540. In addition, a menu screen 581 may be displayed on a screen 580 of the second client device 570. The menu screens 551 and 581 may include a list of rights capable of controlling operations of the master device and the mirroring service. The menu screens 551 and 581 may include a right list from which each of the screen control right, the application execution right, and the mirroring control right is selected.

In operation 422, at least one of the at least one right included in the menu screen is selected through the menu screen displayed in operation 421. Operation 422 may be performed by the input unit 280.

Referring to FIG. 5, a user of the first client device 540 may select a mirroring control right item 552, and a user of the second client device 570 may select an application execution right item 582.

In operation 423, the certain client device requests the master device to grant the right selected in operation 422. The first and second client devices 540 and 570 may individually transmit a right grant request. For example, the first client device 540 may request the master device 510 through the certain network 531 to grant the mirroring control right. The second client device 570 may request the master device 510 through the certain network 533 to grant the application execution right.

In operation 430, the master device, which has received the request in operation 420, grants the requested at least one right to the at least one of the plurality of client devices. In the example described above, the master device 510 may or may not grant the mirroring control right to the first client device 540 in response to the request of the first client device 540. In addition, the master device 510 may or may not grant the application execution right to the second client device 570 in response to the request of the second client device 570. In addition, the master device 510 may transmit a response to a request of a client device to the client device. In addition, when a requested right is not granted to a client device, the control unit 215 may automatically grant the corresponding right to a client device which has requested the corresponding right for the first time.

Operation 430 may include operations 431, 432, and 433.

When the right request in operation 420 exists, in operation 431, the right request is informed to the master device 510, and a menu screen, including the request at least one right, is displayed. Operation 431 may be performed by the display unit 220 according to control of the control unit 215.

Referring to FIG. 5, a menu screen 521 displayed in operation 431 includes rights requested by the first and second client devices 540 and 570. For example, the menu screen 521 may include a portion 522 to indicate that a device which has requested for the application execution right is the second client device 570. In addition, the menu screen 521 may include a portion 523 to indicate that a device which has requested for the mirroring control right is the first client device 540.

In operation 432, a right to be granted to a certain client device is selected through the menu screen. Operation 432 may be performed by the input unit 230. A user may select a client device to which a corresponding right is to be granted, through the menu screen 521. Alternatively, the user may accept a right grant request of a certain client device through the menu screen 521.

In operation 433, the at least one right is granted to the at least one of the plurality of client devices according to a user command inputted through the menu screen. Operation 433 may be performed by the control unit 215. In the example described above, the application execution right may be granted to the second client device 570, and the mirroring control right may be granted to the first client device 540.

The screen control right is a right for controlling a screen displayed on a master device. In detail, the screen control right may include a right for magnifying, reducing, rotating, or editing the entire or a certain region of the screen or a handwriting or drawing right.

The handwriting and/or drawing right in the screen control right may be commonly granted to a plurality of client devices. For example, when it is desired to commonly perform a drawing work in the plurality of client devices, the master device may commonly grant the drawing right in the screen control right to the plurality of client devices.

The screen control right is described below with reference to FIGS. 6 and 7.

Figure 6:
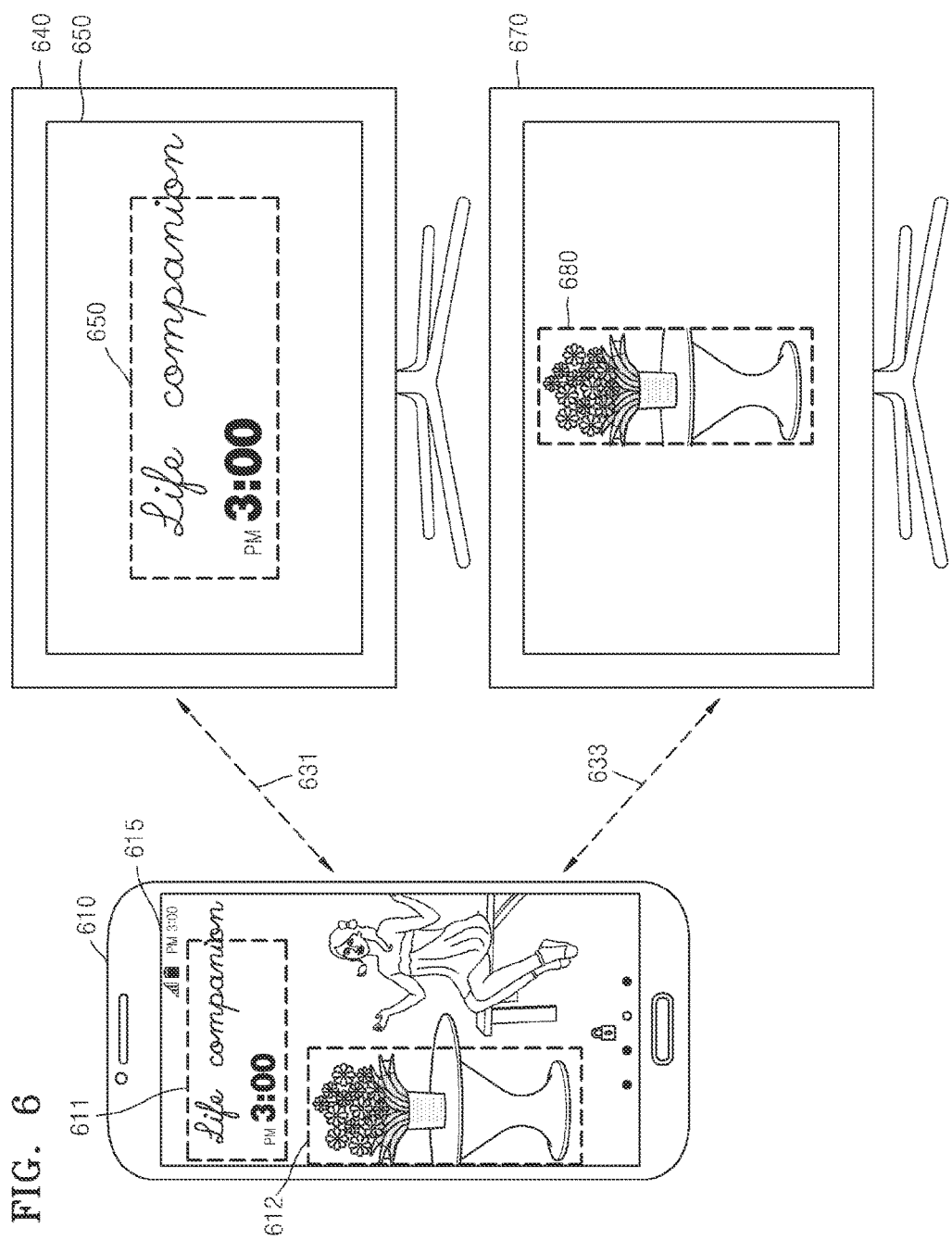
FIG. 6 illustrates a method of managing a control right according to an embodiment of the present disclosure.

FIG. 6 illustrates a method of managing a control right according to an embodiment of the present disclosure.

Referring to FIG. 6 a smartphone that is a master device 610 and smart TVs that are first and second client devices 640 and 670 connected to the master device 610 through certain networks 631 and 633 are shown.

The control unit 215 may divide a screen of the master device 210 into a plurality of regions and grant the screen control right on each of the divided regions to at least one of a plurality of client devices.

Referring to FIG. 6, a first region 611 and a second region 612 may be divided from a screen 615 of the master device 610. Thereafter, the screen control right on the first region 611 may be granted to the first client device 640, and the screen control right on the second region 612 may be granted to the second client device 670.

In addition, the first client device 640 may display a screen 650 obtained by mirroring the screen of the first region 611, and the second client device 670 may display a screen 680 obtained by mirroring the screen of the second region 612.

Accordingly, the first client device 640 may magnify, reduce, rotate, or edit the first region 611 or input a handwriting or drawing to the first region 611, and the second client device 670 may magnify, reduce, rotate, or edit the second region 612 or input a handwriting or drawing to the second region 612.

Figure 7:
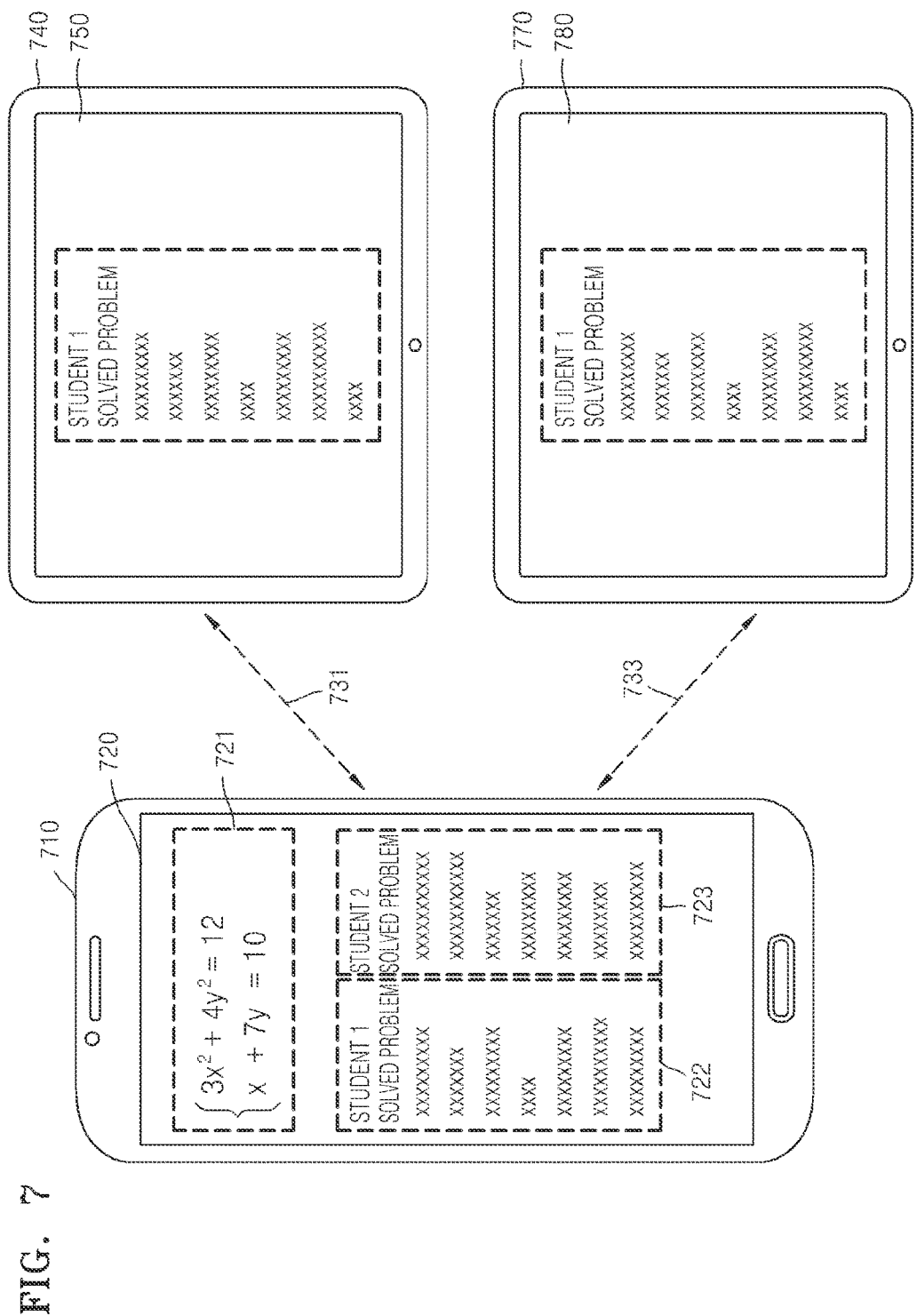
FIG. 7 illustrates a method of managing a control right according to an embodiment of the present disclosure.

FIG. 7 illustrates a method of managing a control right according to an embodiment of the present disclosure. FIG. 7 shows another example of granting the screen control right according to an embodiment of the present disclosure.

Referring to FIG. 7, a smartphone that is a master device 710 and tablet PCs that are first and second client devices 740 and 770 connected to the master device 710 through certain networks 731 and 733 are shown. In addition, screens of the tablet PCs 740 and 770 are formed as touch screens, and the tablet PCs 740 and 770 are used for electronic boards. FIG. 7 shows an example where the screen control right is granted on each divided screen of the master device 710.

When the master device 710 is used for an electronic board, a user of the master device 710 edits a mathematical problem, which is to be solved by students, in a first region 721 and allows the first and second client devices 740 and 770 that are display devices to be used by the students to mirror second and third regions 722 and 723, respectively. The first client device 740 displays a mirroring screen 750 of the second region 722 in the screen displayed on the master device 710, and the second client device 770 displays a mirroring screen 780 of the third region 723 in the screen displayed on the master device 710.

In the example described above, the master device 710 may grant the screen control right on the second region 722 to the first client device 740 and grant the screen control right on the third region 723 to the second client device 770. Accordingly, a student 1 may solve the problem on the touch screen of the first client device 740, and a student 2 may solve the problem on the touch screen of the second client device 770. Thereafter, the master device 710 may check both solved problems of the students 1 and 2.

The application execution right is a right for executing and controlling an application executable by a master device. The application execution right may include at least one of a right for executing, pausing, or updating a certain application in the master device, a right for editing a screen on which applications executable by the master device are displayed, and a right for installing a new application in the master device.

The application execution right is described below with reference to FIG. 8.

Figure 8:
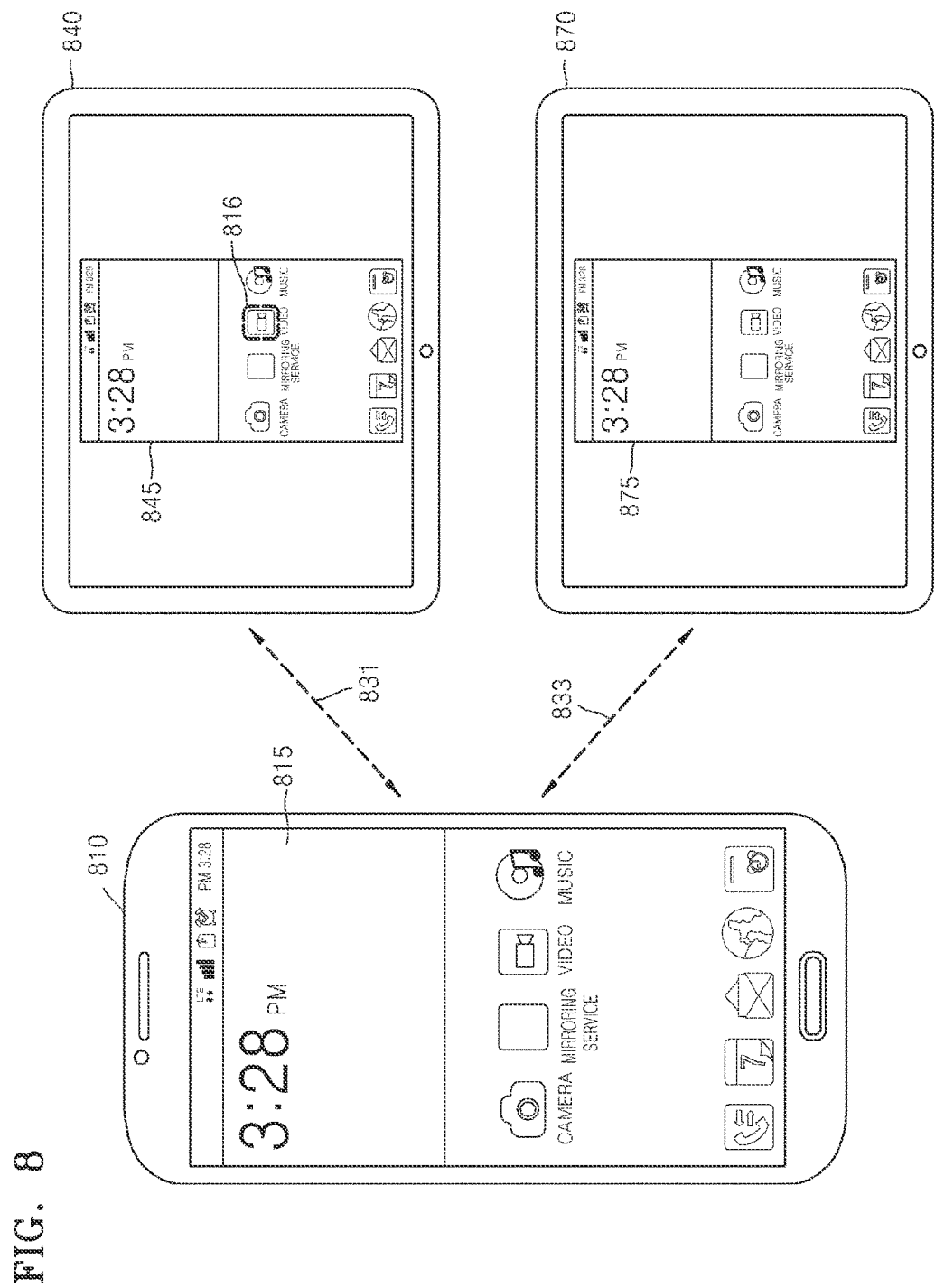
FIG. 8 illustrates a method of managing a control right according to an embodiment of the present disclosure.

FIG. 8 illustrates a method of managing a control right according to an embodiment of the present disclosure.

Referring to FIG. 8, like FIG. 7, a smartphone that is a master device 810 and tablet PCs that are first and second client devices 840 and 870 connected to the master device 810 through certain networks 831 and 833 are shown. In addition, screens of the first and second client devices 840 and 870 are formed as touch screens.

Referring to FIG. 8, the first and second client devices 840 and 870 mirror and display a screen 815 of the master device 810, and the same screen 815 of the master device 810 is displayed on screens 845 and 875 of the first and second client devices 840 and 870.

The first client device 840 may request the master device 810 for the application execution right, and the master device 810 may grant the application execution right to the first client device 840 in response to the request.

For example, the first client device 840 may execute a video play application 816 that is an application stored in the master device 810. If so, the master device 810 plays certain video content, and the screen 815 is changed to a video content play screen. In addition, since the first client device 840 has a right for controlling the executed application, the first client device 840 may perform a control operation, such as pausing, reversing, fast forwarding, volume adjustment, or the like, of the video content being played.

As described above, the application execution right may include an editing right of a screen on which an application is displayed. Therefore, when the application execution right is granted, the screen control right may also be automatically granted. For example, when the first client device 840 requests the master device 810 for the application execution right, the master device 810 may grant the application execution right and the screen control right to the first client device 840. Accordingly, the first client device 840 may change the screen 815 by editing icons corresponding to applications arranged on the screen 815.

The mirroring control right is a right for controlling an operation of the mirroring service. The mirroring control right may include a right for a mirroring connection or release between a master device and a client device, a mirroring service pause, or re-execution of the paused mirroring service.

Compared with the method 300, the method 400 may further include operation 415. In operation 415, a menu screen for informing each of the plurality of client devices of a right grant status is displayed. In addition, a list of devices connected for a mirroring connection may be further included in the menu screen.

In addition, a menu screen including a list of a plurality of client devices connected to the master device for the mirroring service and a list of rights granted for each of the plurality of client devices may be displayed. In addition, a menu screen including at least one of a right grant status, a right grant change status, and a client device connection status may be displayed on at least one of the master device and a plurality of client devices. Operation 415 may be performed by the control unit 215 receiving a right request, granting a requested right, and transmitting right grant information and client device connection information to each of a plurality of client devices.

Although FIG. 4 shows an example where operation 415 is performed after operation 410, operation 415 may also be performed after operation 430 in which the right is granted, or the menu screen may be displayed in a type of notification at every constant time interval. Alternatively, operation 415 may be performed immediately after a mirroring connection of a new client device is performed.

Operation 415 is described below with reference to FIG. 9.

Figure 9:
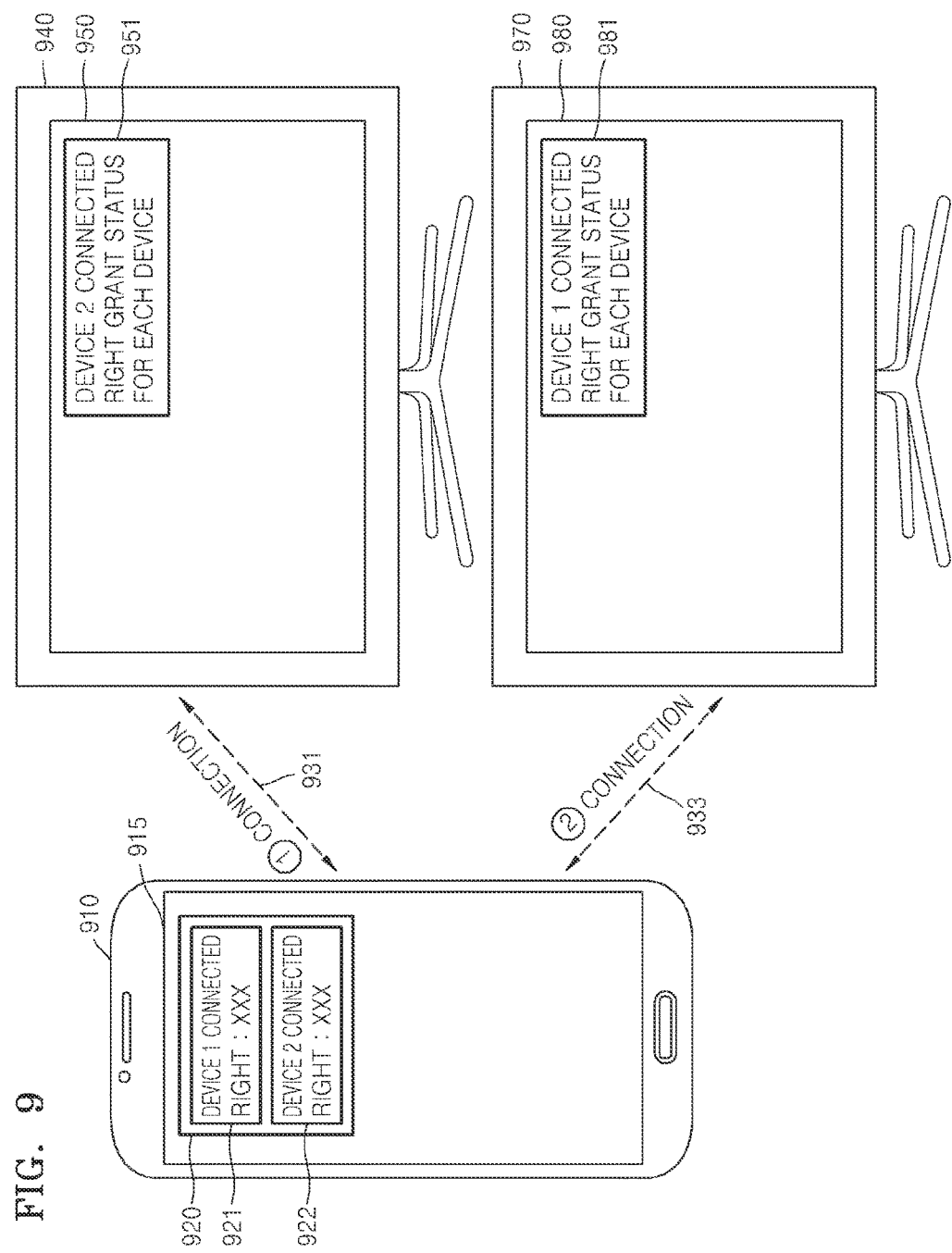
FIG. 9 illustrates a method of managing a control right according to an embodiment of the present disclosure.

FIG. 9 illustrates a method of managing a control right according to an embodiment of the present disclosure.

Referring to FIG. 9, like FIG. 6, a smartphone that is a master device 910 and smart TVs that are first and second client devices 940 and 970 connected to the master device 910 through certain networks 931 and 933 are shown.

Referring to FIG. 9, a case where the second client device 970 is connected for a mirroring connection after a mirroring connection between the master device 910 and the first client device 940 is completed is illustrated.

For example, when the second client device 970 that is a new client device is connected, a menu screen including a right grant status for each of a plurality of client devices and/or a connection status of the plurality of client devices may be displayed.

The first client device 940 may display a menu screen 951, which includes information informing of the connection of the second client device 970 and a right grant status for each device, on a screen 950. The second client device 970 may display a menu screen 981, which includes information informing of the connection of the first client device 940 and the right grant status for each device, on a screen 980. The master device 910 may display a menu screen 920, which includes right grant statuses 921 and 922 for devices currently connected to execute a mirroring service, on a screen 915.

The menu screen displayed in operation 415 may be automatically displayed on at least one of the master device and the plurality of client devices when a certain right is granted to or released from certain client devices. In this case, the menu screen may include information informing each of the plurality of client devices of a right grant status or right grant change details.

The menu screen displayed in operation 415 may be automatically displayed on each of the plurality of client devices when a certain client device is connected to the master device. In this case, the menu screen may include the connection and a right grant status for each of the plurality of client devices.

Figure 10:
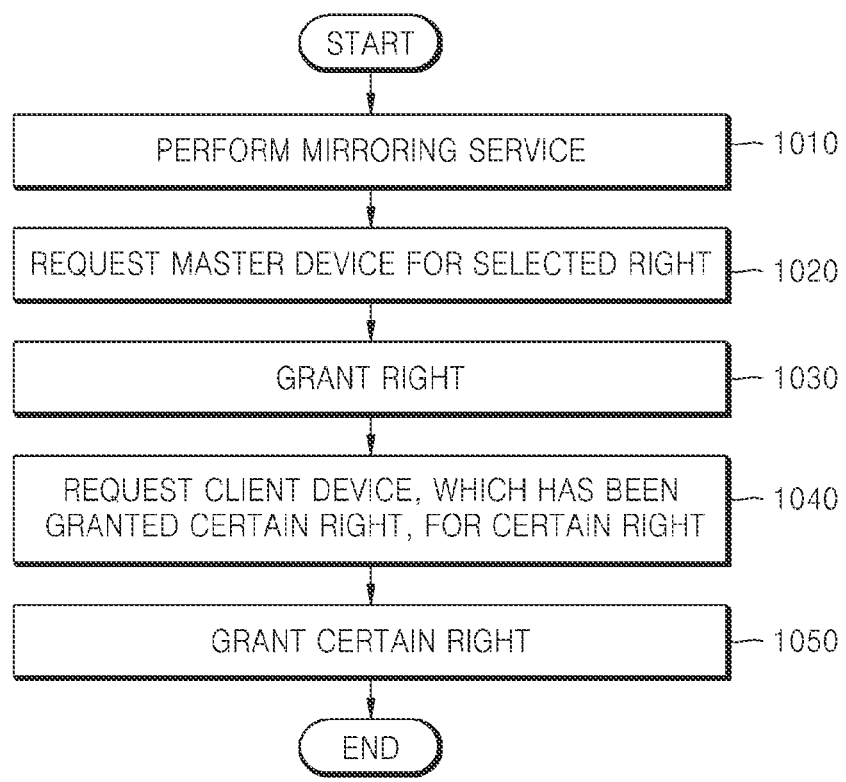
FIG. 10 is a flowchart of a method of managing a control right according to an embodiment of the present disclosure.

FIG. 10 is a flowchart of a method of managing a control right according to an embodiment of the present disclosure.

Referring to FIG. 10, operations 1010, 1020, and 1030 are similar to operations 310, 320, and 330 of the method 300 in FIG. 3, respectively. In addition, operations 1010, 1020, and 1030 in FIG. 10 are similar to operations 410, 420, and 430 of the method 400 in FIG. 4, respectively. Therefore, the same description as made with reference to FIGS. 3 and 4 is omitted. In addition, the method 1000 is performed in a 1:n network topology and may be performed by the master device 210 and/or the client device 260 shown in FIG. 2.

In operation 1010, a mirroring service is performed.

In operation 1020, at least one of a plurality of client devices requests a master device for at least one right for controlling the master device and/or the mirroring service.

In operation 1030, the master device, which has received the request in operation 1020, grants the requested at least one right to the at least one of the plurality of client devices. Hereinafter, a client device, to which a certain right is granted, is referred to as a first client device.

In operation 1040, a second client among the plurality of client devices requests the first client device for the certain right. When another client device has a right for which a certain client device desires to request, instead of the master device, the certain client device may request the client device, which possesses the right, to grant the right. Operation 1040 may be performed according to control of the control unit 265 of the client device 260.

In operation 1050, the first client device grants the certain right to the second client device in response to the request in operation 1040. In operation 1050, the first client device, which has received the right grant request, may grant the certain right to the second client device or may reject the right grant request. Operation 1050 may be performed according to control of the control unit 215 of the master device 210.

Figure 11:
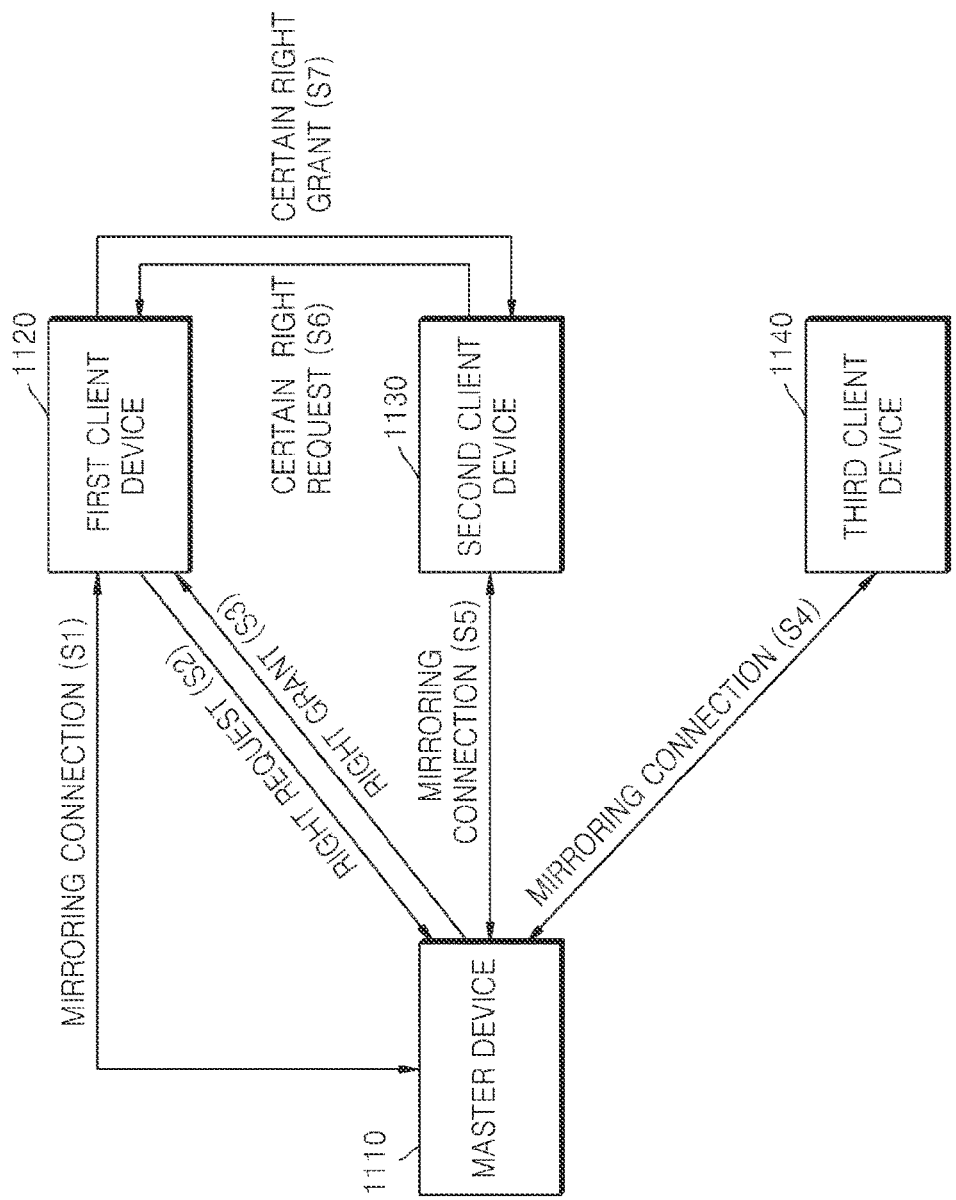
FIG. 11 illustrates the method of managing a control right according to an embodiment of the present disclosure.

FIG. 11 illustrates a method of managing a control right according to an embodiment of the present disclosure.

Referring to FIG. 11 shows an example where a master device 1110 and first, second and third client devices 1120, 1130, and 1140 are mirror-connected.

Referring to FIG. 11, in operation S1, the master device 1110 and the first client device 1120 is first mirror-connected. In operation S2, the first client device 1120 requests the master device 1110 for all rights, including the screen control right, the application execution right, and the mirroring control right. In operation S3, the master device 1110 grants all the requested rights to the first client device 1120 in response to the request in operation S2.

Thereafter, in operation S4, the third client device 1140 is connected to the master device 1110 and completes a mirroring connection, and in operation S5, the second client device 1130 is connected to the master device 1110 and completes a mirroring connection.

When the second client device 1130 desires to request for a certain right, such as the application execution right, the second client device 1130 requests the first client device 1120, which has the application execution right, to grant the certain right in operation S6. In operation S7, the first client device 1120 grants the certain right to the second client device 1130 in response to the request in operation S6.

As described above, according to a method of managing a control right, a client device for the same, and a master device for the same, according to the one or more of the above various embodiments of the present disclosure, each of a plurality of rights is allocated in a 1:n network topology. Accordingly, a control right does not overlap, thereby solving a control error problem which may occur due to overlapping of the control right between a plurality of client devices.

Therefore, to meet a user's desire, a plurality of client devices may be flexibly used in a 1:n network topology.

A method of managing a control right, according to the one or more of the above various embodiments of the present disclosure, may be embodied as computer-readable code or program on a computer-readable recording medium. The computer-readable recording medium is any data storage device that may store data that may thereafter be read by a computer system. Examples of the computer-readable recording medium include Read-Only Memory (ROM), Random-Access Memory (RAM), CD-ROMs, magnetic tape, hard disk, floppy disk, flash memory, and optical data storage devices.

In addition, other various embodiments of the present disclosure can also be implemented through computer-readable code/instructions in/on a medium, e.g., a computer-readable medium, to control at least one processing element to implement any above-described embodiment. The medium can correspond to any non-transitory medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, etc.), and transmission media such as Internet transmission media. Thus, the medium may be such a defined and measurable structure including or carrying a signal or information, such as a device carrying a bitstream according to one or more various embodiments of the present disclosure. Furthermore, the processing element could include a processor or a computer processor, and processing elements may be distributed and/or included in a single device.

It should be understood that the various embodiments described therein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A master device comprising:
a display configured to display a screen;
a transceiver; and
at least one processor configured to: control the transceiver to:
establish a mirroring connection with a plurality of client devices,
receive requests for rights from among a plurality of rights for controlling the master device from each of a first and a second client device among the plurality of client devices, wherein the rights comprise a first screen control right and a second screen control right, and
transmit, to the plurality of client devices, a response for granting the requested rights to the first and the second client devices among the plurality of client devices in response to each request,
divide the screen into at least two regions comprising a first screen region and a second screen region, and
grant the first screen control right controlling the first screen region to the first client device and the second screen control right controlling the second screen region to the second client device, respectively, wherein granting the requested rights is according to predetermined priorities of the plurality of client devices.

2. The master device of claim 1, wherein the at least one right includes at least one of a screen control right for controlling a screen displayed on the master device, an application execution right for executing and controlling an application executable by the master device, or a mirroring control right for controlling an operation of the mirroring service.

3. The master device of claim 2,
wherein the display is further configured to display a menu screen including the requested at least one right, and
wherein the master device further comprises an input unit configured to receive a selection for selecting at least one right to be granted to a certain client device from a user, through the menu screen.

4. The master device of claim 2, wherein the at least one processor is further configured to grant the at least one right to the at least one among the first and the second client devices according to predetermined priorities.

5. The master device of claim 1,
wherein the at least one processor is further configured to grant at least one of a handwriting right to the first client device or a drawing right on the screen to the second client device.

6. The master device of claim 1,
wherein the at least one processor is further configured to grant an application execution right for executing and controlling an application executable by the master device and a screen control right for controlling the first screen to a certain client device when the master device receives a request for the application execution right from the certain client device.

7. The master device of claim 1, wherein the at least one processor is further configured to control a menu screen informing of a right grant status or right grant change details for each of the plurality of client devices so as to be displayed when a certain right is granted to or released from certain client devices.

8. The master device of claim 1, wherein the at least one processor is further configured to control a menu screen informing of a connection of a certain client device and a right grant status for each of the plurality of client devices so as to be displayed when the certain client device is connected to the master device.

9. A client device mirroring a master device, the client device comprising:
a transceiver; and
at least one processor configured to control the transceiver to:
request establishment of a mirroring connection with the master device,
transmit a request to the master device for at least one right from among a plurality of rights for controlling the master device, and receive the requested at least one right from the master device in response to the request, wherein the requested at least one right is a first screen control right controlling a first screen region among the first screen and a second screen divided on a screen displayed on the master device, wherein the received at least one right is determined by the master device based on the request and another request for at least one right from among the plurality of rights which is transmitted from another client device to the master device, and wherein the requested at least one right is granted according to predetermined priorities of the plurality of client devices.

10. The client device of claim 9, further comprising:
a display; and
an input unit,
wherein the at least one processor is further configured to control a menu screen for selecting at least one of a screen control right for controlling the screen displayed on the master device, an application execution right for executing and controlling an application executable by the master device, and a mirroring control right for controlling an operation of the mirroring service so as to be displayed, wherein the display is configured to display a menu screen including the requested right, and wherein the input unit is configured to receive a selection for selecting at least one right to be requested from the master device from a user, through the menu screen.

11. The client device of claim 10, wherein the at least one processor is further configured to request the master device for the selected right.

12. The client device of claim 10, wherein the at least one processor is further configured to, when the client device is granted a certain right of the at least one right from the master device, if the other client device requests the client device for the certain right, determine whether to grant the certain right to the other client device.

13. The client device of claim 9, wherein the at least one processor is further configured to request the other client device for the other right of the at least one right when the other client device has acquired the other right.

14. The client device of claim 9,
wherein the at least one processor is further configured to request a screen control right for controlling the screen being displayed on the master device, and wherein the screen control right includes at least one of a right for magnifying, reducing, rotating, or editing the entire or a certain region of the screen and a handwriting or drawing right.

15. The client device of claim 9,
wherein the at least one processor is further configured to request the master device for an application execution right for executing and controlling an application executable by the master device, and wherein the application execution right includes a screen control right for controlling the screen being displayed on the master device.

16. The client device of claim 15, wherein the application execution right includes at least one of a right for executing, pausing, or updating a certain application in the master device, a right for editing the screen on which applications executable by the master device are displayed, or a right for installing a new application in the master device.

17. A method of managing a control right, the method being performed in a master device, the method comprising:
establishing a mirroring connection with a plurality of client devices;
receiving requests for rights from among a plurality of rights for controlling the master device from each of a first and a second client device among the plurality of client devices, wherein the rights comprise a first screen control right and a second screen control right;
transmitting, to the plurality of client devices, a response for granting the requested rights to the first and second client devices among the plurality of client devices in response to each request;
dividing a screen into at least two regions comprising a first screen region and a second screen region; and
granting the first screen control right controlling the first screen region to the first client device and the second screen control right controlling the second screen region to the second client device,
wherein granting the requested rights is according to predetermined priorities of the plurality of client devices.

18. A method of managing a control right, the method being performed in a client device which mirrors a screen displayed on a master device, the method comprising:
establishing a mirroring connection with the master device;
requesting, by the client device from the master device, at least one right from among a plurality of rights for controlling the master device; and
receiving the requested at least one right from the master device in response to the request, wherein the requested at least one right is a first screen control right controlling a first screen region among the first screen and a second screen divided on a screen displayed on the master device;
wherein the received at least one right is determined by the master device based on the request and another request for at least one right from among the plurality of rights which is transmitted from another client device to the master device, and
wherein the requested at least one right is granted according to predetermined priorities of the plurality of client devices.

* * * * *